(12) United States Patent
Budina

(10) Patent No.: US 9,085,677 B2
(45) Date of Patent: Jul. 21, 2015

(54) BIOPLASTICS

(76) Inventor: Erica Budina, Medford, MA (US)

( * ) Notice: Subject to any disclaimer, the term of this patent is extended or adjusted under 35 U.S.C. 154(b) by 575 days.

(21) Appl. No.: 13/355,856

(22) Filed: Jan. 23, 2012

(65) Prior Publication Data

US 2013/0186303 A1    Jul. 25, 2013

(51) Int. Cl.
*C08L 3/00* (2006.01)
*C08L 5/12* (2006.01)
*C08L 3/02* (2006.01)
*C08L 89/06* (2006.01)

(52) U.S. Cl.
CPC ... *C08L 5/12* (2013.01); *C08L 3/02* (2013.01); *C08L 89/06* (2013.01)

(58) Field of Classification Search
None
See application file for complete search history.

(56) References Cited

U.S. PATENT DOCUMENTS

| 5,716,440 | A | 2/1998 | Andou |
| 7,998,888 | B2 | 8/2011 | Shi et al. |
| 2002/0026747 | A1 | 3/2002 | Howe et al. |
| 2007/0219141 | A1 | 9/2007 | Jones et al. |
| 2008/0167436 | A1 | 7/2008 | Schilling et al. |
| 2008/0182924 | A1* | 7/2008 | Morimoto et al. ............... 524/21 |
| 2008/0188636 | A1 | 8/2008 | Argyropoulos et al. |
| 2009/0099079 | A1 | 4/2009 | Emalfarb et al. |
| 2009/0229771 | A1 | 9/2009 | Warnes et al. |
| 2009/0264560 | A1 | 10/2009 | Warnes et al. |
| 2009/0283473 | A1 | 11/2009 | Jones et al. |
| 2010/0056672 | A1 | 3/2010 | Sartore et al. |
| 2010/0119417 | A1 | 5/2010 | Motadel et al. |
| 2010/0216909 | A1 | 8/2010 | Berg Gebert et al. |
| 2011/0009593 | A1 | 1/2011 | Clardy et al. |
| 2011/0086395 | A1 | 4/2011 | Koopman et al. |
| 2011/0092726 | A1 | 4/2011 | Clarke |
| 2013/0096236 | A1* | 4/2013 | Bernaerts et al. ................ 524/9 |

FOREIGN PATENT DOCUMENTS

| FR | 2957928 | * | 9/2011 |
| FR | WO2011/117549 | * | 9/2011 |
| WO | WO 2011/117549 | * | 9/2011 |

OTHER PUBLICATIONS

E.S. Stevens, "Green Plastics, An Introduction to the New Science of Biodegradable Plastics," Princeton University Press (2002).

* cited by examiner

*Primary Examiner* — Patricia L Hailey
*Assistant Examiner* — Colette Nguyen
(74) *Attorney, Agent, or Firm* — Fish & Richardson P.C.

(57) ABSTRACT

Bioplastics including an oligosaccharide, a plasticizer, and an additive are described. Such bioplastics display advantageous attributes including tensile strength that can be tailored for particular uses. Processes for obtaining such bioplastics are also described.

19 Claims, 2 Drawing Sheets

BIOPLASTICS

TECHNICAL FIELD

This disclosure relates to bioplastics, products that include such bioplastics, and methods of making and using the same.

BACKGROUND

More than about 200 billion pounds of petroleum-based plastics are produced annually, which can require more than seven million barrels of petroleum oil daily. Over one billion tons of plastic have been disposed of as waste, the majority of which may require thousands of years to decompose. Additionally, both manufacturing and disposing of plastic products by incineration releases vast quantities of toxins that can be damaging to human-inhabited ecosystems. Bioplastics are considered viable alternatives for replacing petroleum-based plastics.

Bioplastics are typically derived from renewable raw materials and can contain one or more biopolymeric substances. Bioplastics can be used in different settings such as catering products where the perishable plastics can be used to make disposable crockery and cutlery. Biodegradable plastics are further described in "Green Plastics, An Introduction to the New Science of Biodegradable Plastics," by E. S. Stevens, Princeton University Press (2002) which is incorporated by reference herein in its entirety. Improvement in the properties of bioplastics, especially in their tensile strength, remains an issue. Thus, new or improved materials and methods such as those described herein are very much needed. The compositions, as well as the methods, described herein are directed toward these needs and other ends.

SUMMARY

This disclosure relates, inter alia, to bioplastics, products that include such bioplastics, and methods of making and using the same. The subject matter described in this specification can be embodied in a method that includes a bioplastic including an oligosaccharide, a plasticizer, and an additive.

In one aspect of the disclosure, a bioplastic can include an oligosaccharide, a plasticizer, and an additive. The additive can be powered clamshell, powdered eggshell, powdered coconut shell, gelatin, saw dust, or combinations thereof.

In another aspect, the disclosure describes a process for making a bioplastic including heating a mixture, which includes a polysaccharide obtained from a renewable source, water, a plasticizer, and an additive; applying the hot mixture to a mold of desired structure; cooling the mixture in the mold to provide a molded structure; and removing the molded structure.

In another aspect, the disclosure describes a bioplastic obtained by heating a mixture, which includes a polysaccharide obtained from a renewable source, water, a plasticizer, and an additive; applying the hot mixture to a mold of desired structure; cooling the mixture in the mold to provide a molded structure; and removing the molded structure.

In yet another aspect, the disclosure describes an article including a bioplastic.

One or more of the above aspects of the disclosure can include one or more of the following implementations.

In some implementations, the oligosaccharide is obtained by hydrolysis of a polysaccharide (such as starch, agar or a combination of both) obtained from a renewable source.

In some implementations, the hydrolysis of polysaccharide is performed in the presence of an acid.

In some implementations, the starch is corn starch, arrowroot starch, barley starch, cassava starch, maize starch, millet starch, oat starch, potato starch, rice starch, tapioca starch, sago starch, sorghum starch, sweet potato starch, wheat starch, soy starch, or combinations thereof.

In some implementations, the plasticizer is one or more of polyethers, polyols, ureas, polyethylene glycols, glycerol and sorbitol.

In some implementations, the bioplastic includes from about 1% to about 5% of the additive.

In one implementation, the plasticizer is glycerol; the additive is a combination of powered clamshell, powered eggshell and sawdust; and the bioplastic further comprises gelatin.

In some implementations, the acid is acetic acid.

As used herein, "bioplastic" refers to a plastic whose components are derived from renewable raw materials. The bioplastic is typically biodegradable, and can be shaped, inter alia, by being formed, molded or extruded into a desired shape. A blend of bioplastic refers to a plastic or a bioplastic composition which includes at least one bioplastic.

As used herein, "biopolymer" refers to a polymer derived from a natural source, such as a plant or an animal. A biopolymer may also be a combination of such polymers, such as in a mixture or as a copolymer.

"Additive" as used herein, refers to materials added to the bioplastic to enhance the properties of the bioplastic. Additives may be derived e.g., from coconut, eggs, clams, wood, pulp, paper, sawdust, collagen, or gelatin.

Implementations and/or aspects of the disclosure may include one or more of the following advantages. Advantages of bioplastic materials include that they may be strong, waterproof, light, simple to manufacture, and inexpensive. Waterproof implementations do not require a waterproof liner. Additionally, the fact that bioplastic materials can dissolve in the body or can be compostable makes them environmentally-friendly, since they need not end up in landfill sites, and they need not require any additional expenditure of energy for disposal. Hence, they can conserve fossil fuels and can reduce the global annual carbon dioxide emissions. Biodegradability also makes the use of bioplastics applicable in the packaging sector such as in shopping bags. After their initial use, such bags can be reused as bags for organic waste and then composted. Trays and containers for fruit, vegetables, eggs and meat; bottles for soft drinks and dairy products and blister foils for fruit and vegetables can also be manufactured from bioplastics.

All publications, patent applications, patents, and other references mentioned herein are hereby incorporated by reference herein in their entirety.

It is to be further appreciated that certain features of the disclosure, which are, for clarity, described in the context of separate embodiments, can also be provided in combination in a single embodiment. Conversely, various features of the disclosure that are, for brevity, described in the context of a single embodiment, can also be provided separately or in any suitable sub-combination.

The details of one or more implementations of the disclosure are set forth in the accompanying drawings and the description below. Other features, objects, and advantages of the disclosure will be apparent from the description and drawings, and from the claims.

BRIEF DESCRIPTION OF DRAWINGS

Like reference symbols in the various drawings indicate like elements.

DETAILED DESCRIPTION

The present disclosure provides, inter alia, a bioplastic including an oligosaccharide, a plasticizer, and an additive. Bioplastics, including their blends, can be composed of a matrix, which can include a biopolymer and optionally other additives such as naturally occurring fibers, which can be derived from natural plant fibers. Upon disposal, many bioplastics can safely and naturally biodegrade. Bioplastic materials can usually dissolve by alkaline hydrolysis. The components of bioplastics such as the biopolymer and additives can typically be made from organic sources instead of from petroleum sources. Such raw material sources are renewable and sustainable. These sources include, for example, plant sources such as plant starch, sugarcane, tapioca, wheat, and potato; or microbial sources, such as, algae and fungi. Such bioplastic formulations can be advantageously used in various applications due to their increased tensile strength.

Figure 1:
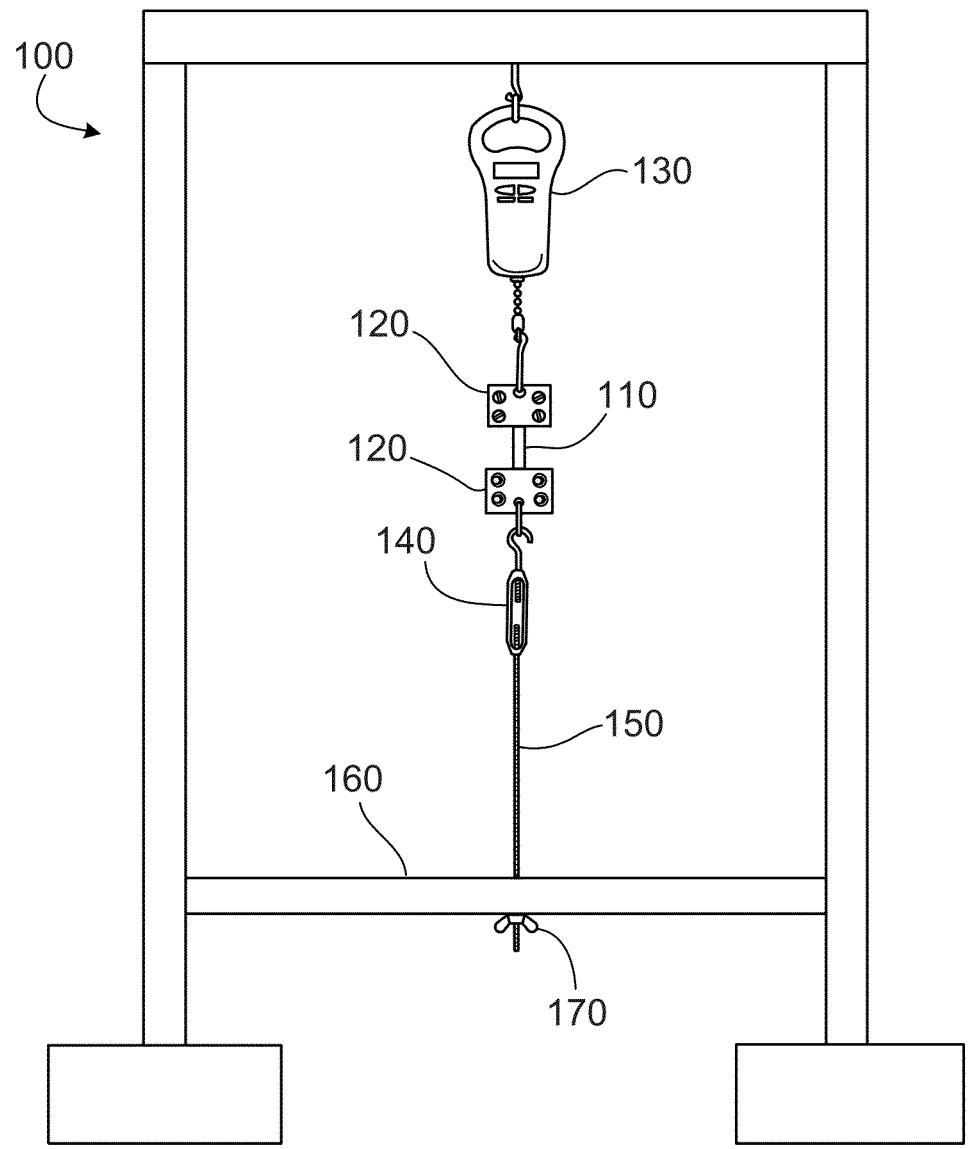
FIG. 1 is an illustration of an apparatus for measuring tensile strength.

The increased tensile strength of the bioplastics can be achieved, for example, by the use of selected additives such as naturally occurring fibers, which are also obtained from natural sources and are biodegradable. Thus, tensile strength can be modified without sacrificing the benefits provided by bioplastics. The addition of additives does not typically increase the tensile strength of the resultant bioplastic. The tensile strength is the force per unit area that can be applied to a material, it is usually measured either as a tensile strength at break, which is the value at which the test specimen is broken, or as ultimate tensile strength (UTS), which is the value at which the test specimen "necks" i.e., reduces in cross-sectional area. The UTS can be determined by methods such as the ASTM D638. This disclosure describes a relatively simple method for measuring the UTS of samples. In FIG. 1, the measuring device 100 includes a bioplastic sample 110 that can be attached to the flanges of an aluminum sample holder 120 which in turn is connected at one end to a Berkeley spring scale 130 and on the other end to a turnbuckle 140 mounted upon a threaded steel rod 150, to which a wing nut 170 is secured at the bottom of the wooden piece 160. Upon attaching the aluminum sample holder 120 between the scale 130 and the turnbuckle 140, the steel rod 150 can be pulled downward, to exert stress on the bioplastic 110. After each downward pull, the wing nut 170 is adjusted to prevent the upward movement of the steel rod 150. Such a downward pull of the steel rod 150 ensures that the force is applied perpendicular to the sample with minimal twisting or bending of the sample 110. The force exerted is noted at each incremental downward pull of the steel rod 150, and the highest value is converted to the ultimate tensile strength (UTS) of the bioplastic. The force exerted can be increased further to determine the tensile strength at break of the sample. The UTS may or may not be same as the tensile strength at break. In some implementations, the tensile strength is from about 1 MPa to about 150 MPa, e.g., from about 5 MPa to about 100 MPa, from about 10 MPa to about 75 MPa, from about 1 MPa to about 75 MPa, from about 1 MPa to about 50 MPa, from about 1 MPa to about 40 MPa, from about 1 MPa to about 30 MPa, from about 1 MPa to about 20 MPa, or from about 1 MPa to about 10 MPa. In some implementations, the tensile strength is less than about 10 MPa, e.g., less than about 20 MPa, less than about 30 MPa, less than about 40 MPa, less than about 50 MPa, less than about 60 MPa, less than about 70 MPa, less than about 80 MPa, less than about 90 MPa, or less than about 100 MPa.

Generally, the oligosaccharide in the bioplastic can be any suitable oligosaccharide, or its ester or ether derivative that can be obtained by the hydrolysis of a polysaccharide from a natural source. The oligosaccharide can be used directly in the preparation or it can be generated during the process of preparation of the bioplastic. Examples of polysaccharides include starch, cellulose, agar, and their mixtures. Starch is a biodegradable polysaccharide biopolymer composed of D-glucose units $(C_6H_{10}O_5)_n$. It consists of the polymers amylase and amylopectin. Amylose is a straight, flexible, and helical polymer composed of long chains of 1,000-2,000 glucose units connected by $\alpha(1\rightarrow4)$ linkages. In some implementations, the starch has amylose from about 5% to about 50%, e.g., from about 10% to about 40%, from about 15% to about 30%, from about 20% to about 30%, from about 5% to about 10%, from about 10% to about 20%, from about 30% to about 40%, or from about 40% to about 50%. In some implementations, the starch has less than about 50% amylose, e.g., less than about 45% amylose, less than about 40% amylose, less than about 35% amylose, less than about 30% amylose, less than about 25% amylose, less than about 20% amylose, less than about 15% amylose, or less than about 10% amylose. Amylopectin is a large polymer that contains up to about $10^5$ glucose units; it contains random branches linked by $\alpha(1\rightarrow4)$ glycosidic linkages.

Cellulose, a polysaccharide, has linear D-glucose units linked through a $\beta(1\rightarrow4)$ linkage. It is generally obtained from cotton or wood pulp.

Agar is a polysaccharide obtained from red algae. It consists of polymers agarose (typically 10-25%) and agaropectin (typically 75-90%). Agarose is a straight, linear polymer consisting of repeating units of the disaccharide agarobiose. Agaropectin is a branched and sulfated (or pyruvated) polymer consisting of a heterogeneous mixture of smaller molecules.

While not intending to be bound by any particular theory, it is surmised that the cleavage of $\alpha(1\rightarrow4)$ in straight chains or the cleavage of $\alpha(1\rightarrow4)$ glycosidic linkages such as at the branching points creates a homogenous mass of long, straight polymers or oligomers. In some implementations, the cleavage can be achieved by hydrolysis under acidic conditions. In some implementations, the cleavage can further be aided by elevated temperatures.

Acids that can be used in aiding the hydrolysis include carboxylic acids, organophosphoric acids, organosulfonic acids, and organoboric acids. Examples of carboxylic acids include formic acid, acetic acid, propionic acid, oxalic acid, malonic acid, succinic acid, glutaric acid, adipic acid, maleic acid, malic acid, oleic acid, salicylic acid, gallic acid, citric acid, lactic acid, tartaric acid (e.g., dextro-tartaric acid, meso-tartaric acid, etc.), glycolic acid, trifluoroacetic acid, benzoic acid, 4-hydroxybenzoic acid, aminobenzoic acid, and p-toluenesulfonic acid. Phenols, such as pyrogallol (benzene-1,2,3-triol) and catechol (benzenediol) can also be used as acids. Anhydrides (e.g., acetic anhydride, succinic anhydride, trifluoroacetic anhydride) may also be employed.

Plasticizers are materials that can soften and loosen a polymer structure by reducing the intermolecular forces and increasing the intermolecular mobility of the polymer. Typically, if the amount of plasticizer is increased, the bioplastic can become more elastic and workable. On the other hand, if the amount of plasticizer is reduced, the bioplastic can become more rigid and brittle. As used herein, "plasticizer" refers to materials, including compounds, capable of plasticizing or softening a biopolymer. Plasticizers can also reduce the viscosity of a biopolymer during its preparation. Examples of plasticizers include low molecular weight polymers, oligomers, copolymers, small organic molecules, low molecular weight polyols, glycol ethers, poly(propylene glycol), low molecular weight polyethylene glycol), citrate ester-type plasticizers, triacetin, propylene glycol, sugar alcohols, glycerin, urea, urea derivatives and mixtures thereof. In some implementations, the plasticizer is ethylene glycol, propylene glycol, glycerol, 1,2-butylene glycol, 2,3-butylene glycol, styrene glycol, diethylene triethylene glycol, tetraethylene glycol, hexane triol, mannitol, sorbitol, monopropylene glycol monoisopropyl ether, propylene glycol monoethyl ether, ethylene glycol monoethyl ether, diethylene glycol monoethyl ether, sorbitol lactate, ethyl lactate, butyl lactate, ethyl glycolate, dibutylsebacate, acetyltributylcitrate, triethyl citrate, acetyl triethyl citrate, tributyl citrate allyl glycolate or a mixture thereof.

Additives can be used to further increase the mechanical properties of bioplastics. These additives can function as reinforcing agents that make the biopolymer chains more regular. The increase in the alignment of the biopolymer chains can result in a better structure and also in improved mechanical properties. Examples of additives include powered clamshell, powdered eggshell, powdered coconut shell, gelatin, and saw-dust. Additives can be derived from natural renewable sources and can be further processed to change their particle size and form. In some implementations, the bioplastic includes from about 1% to about 5% of the additive, from about 5% to about 10% of the additive, from about 110% to about 15% of the additive, from about 15% to about 20% of the additive, from about 20% to about 25% of the additive, from about 25% to about 30% of the additive, from about 30% to about 35% of the additive, or from about 35% to about 40% of the additive. In some implementations, the bioplastic includes about 0.5% of the additive, e.g., about 1% of the additive, about 2% of the additive, about 3% of the additive, about 4% of the additive, about 5% of the additive, or about 6% of the additive. In some implementations, the ratio of polysaccharide to additive is about 2:1, e.g., about 3:1, about 4:1, about 5:1, about 6:1, about 7:1, about 8:1, about 9:1, or about 10:1.

A bioplastic composition can be prepared by combining predetermined amounts of a polysaccharide obtained from a renewable source, such as a starch, a plasticizer, an additive, and an acid in a solvent such as water. The combined components can be heated with stirring to make a homogeneous melt. Alternately, the above components can be premixed without the addition of water and stored such that the mixture can be heated together with water to thrill a melt just before processing the bioplastic. Any type of melt blending device can be used, in some implementations, a cooking stove, a microwave oven such as a domestic microwave, or a hot plate with a mechanical stirrer is used. Depending on the desired shape and application of the bioplastic, the melt can be processed. Examples of processing include molding, blowing, flat die extruding, and casting. In some implementations, the melt can be poured onto a dog bone shaped mold lined with a wax paper. The sample can be dried under ambient condition or under conditions of low humidity such as in a desiccator.

The bioplastics described in the disclosure can be molded into shapes and designs as desired in a particular application, such as cell phones, laptops, credit cards, shampoo bottles, shopping bags, eating trays, eating utensils, garbage bags/compost bags, trash bin liners, single-use disposable packaging materials, foam packaging, fishing nets or agricultural products e.g., pots, mulches, or mulch films. The bioplastic articles can be reused or can be composted with the residues on them. In some implementations, the bioplastics described can be biocompatible or bioabsorbable allowing for bioplastic seam material for use in surgery or artificial replacements such as screws, nails, and plates.

Examples of biopolymers include proteins such as gelatin. Mixtures of any two or more of polysaccharides and proteins also represent biopolymers.

The bioplastics described in this disclosure can contain smaller amounts of other ingredients without hindering the desired properties of the bioplastic. Examples of such ingredients include dispersion aids, melt stabilizers, processing stabilizers, heat stabilizers, light stabilizers, antioxidants, heat aging stabilizers, whitening agents, anti-blocking agents, bonding agents, and lubricants.

EXAMPLES

Example 1

30 mL of biopolymer, 120 mL of water, 10 mL, of glycerin, and 10 mL of vinegar were combined in a pan and stirred until the mixture was homogeneous. The mixture was heated on a cooking stove at a low setting (about 90° C.) and stirring continued until the mixture thickened into a viscous gel-like mixture. The mixture was poured into a dog bone shaped mold lined with wax paper. The mixture was lightly flattened with wooden rod and the samples were dried for ten days in an ambient environment (with temperatures ranging from 20° C.-22° C. and humidity ranging from 47% to 53%). The dried sample was subjected to the tensile strength test (See, Example 4).

TABLE 1

UTS of bioplastics containing different biopolymers

| | Ultimate Tensile Strength (MPa) | | | |
|---|---|---|---|---|
| | Corn Starch | Potato Starch | Agar + Potato Starch + Gelatin | Agar |
| Trial 1 | 2.2 | 3.9 | 5.2 | 6.1 |
| Trial 2 | 1.6 | 2.4 | 4.8 | 5.2 |
| Trial 3 | 1.9 | 2.8 | 5.0 | 6.7 |
| Trial 4 | 1.8 | 3.8 | 4.4 | 5.4 |
| Mean | 1.9 | 3.2 | 4.9 | 5.8 |

Example 2

Figure 2:
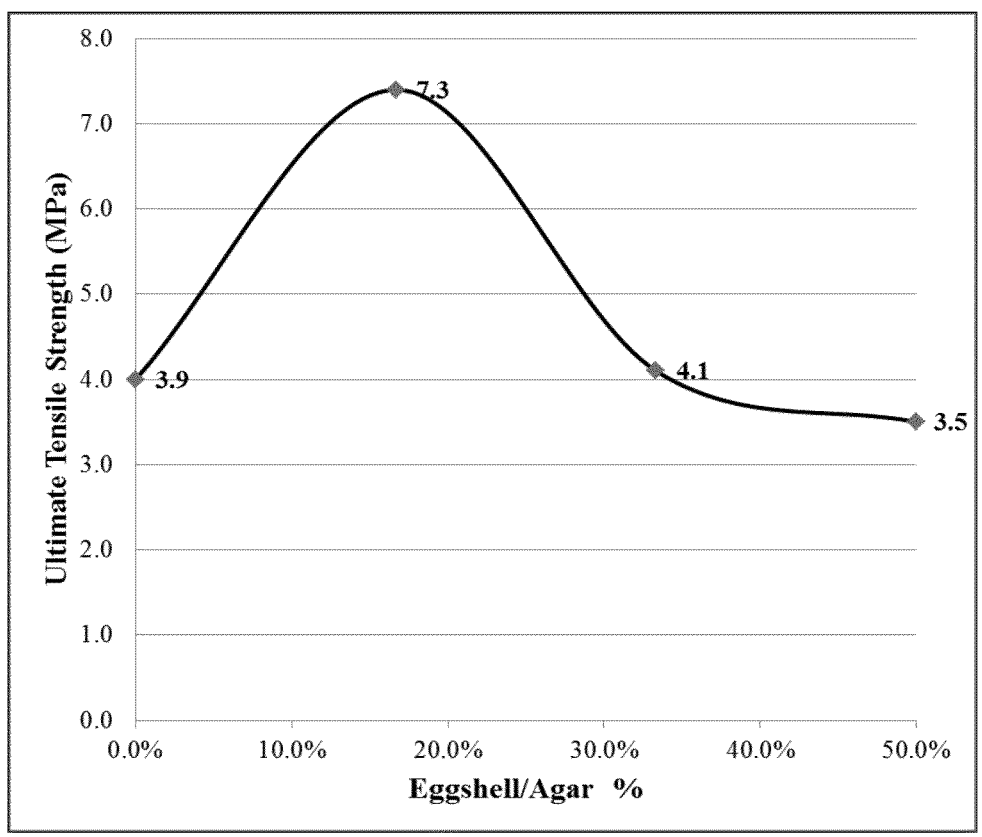
FIG. 2 is a plot of variation in tensile strength of a bioplastic with the amount of powdered eggshell.

The procedure in Example 1 was repeated with the following ingredients: 30 mL of agar powder, 150 mL of water, 10 mL of glycerin, 10 mL of vinegar, and 0-15 mL of eggshell additive. The variation of UTS with the amount of powdered eggshell additive is tabulated in Table 2 and depicted in the plot of FIG. 2.

TABLE 2

UTS of bioplastics containing varying amounts of powdered eggshell

| | Ultimate Tensile Strength (MPa) | | | |
|---|---|---|---|---|
| | 0% eggshell (0 mL) | 16.7% eggshell (5 mL) | 33.3% eggshell (10 mL) | 50% eggshell (15 mL) |
| Trial 1 | 3.8 | 6.3 | 4.2 | 3.7 |
| Trial 2 | 4.0 | 8.0 | 3.7 | 3.2 |
| Trial 3 | 4.3 | 7.7 | 4.3 | 3.5 |

TABLE 2-continued

UTS of bioplastics containing varying
amounts of powdered eggshell

| | Ultimate Tensile Strength (MPa) | | | |
|---|---|---|---|---|
| | 0% eggshell (0 mL) | 16.7% eggshell (5 mL) | 33.3% eggshell (10 mL) | 50% eggshell (15 mL) |
| Trial 4 | 3.7 | 7.4 | 4.1 | 3.4 |
| Mean | 3.9 | 7.3 | 4.1 | 3.5 |

Example 3

The procedure in Example 1 was repeated with the following ingredients: 30 mL of agar powder, 120 mL of water, 10 mL of glycerin, 10 mL of vinegar, and one of the following materials as the additive: a combination of 1.25 mL powered clamshell+2.5 mL powdered eggshell+1.25 mL powdered coconut shell+1.25 mL gelatin; powdered clamshell (5.0 mL); sawdust (5.0 mL); and no additive. The UTS of each of the above combinations is tabulated below (Table 3).

TABLE 3

UTS of bioplastics containing different additives

| | Ultimate Tensile Strength (MPa) | | | |
|---|---|---|---|---|
| | Combination | Clamshell | Sawdust | No additive |
| Trial 1 | 8.4 | 8.2 | 6.7 | 4.7 |
| Trial 2 | 8.2 | 7.0 | 4.4 | 6.0 |
| Trial 3 | 8.3 | 8.8 | 8.8 | 5.8 |
| Trial 4 | 8.5 | 7.5 | 5.8 | 4.8 |
| Mean | 8.4 | 7.9 | 6.4 | 5.3 |

Example 4

Tensile Strength Measurement

The samples were cut to appropriate dimensions, fastened into the aluminum flanges of the sample holder and placed between the hook of the Berkeley spring scale and the hook of the turnbuckle. The steel rod is pulled down in small increments while recording the values from the gauge and the highest value before the sample breaks was noted. The ultimate tensile strength (UTS) was calculated by dividing the highest value of force in Newton by the cross sectional area of the specimen in $mm^2$.

Other Implementations

A number of implementations have been described. Nevertheless, it will be understood that various modifications can be made without departing from the spirit and scope of the disclosure. Accordingly, other implementations are within the scope of the following claims. For example, while starch, cellulose and agar have been described for polysaccharides, other materials, e.g., pectin, chitin, glycogen, and arabinoxylan, can also be used.

Still other implementations are within the following claims.

What is claimed is:

1. A bioplastic comprising an oligosaccharide, a plasticizer, and an additive, wherein, the additive is selected from the group consisting of powdered clamshell, powdered eggshell, powdered coconut shell, gelatin, saw dust, and combinations thereof.

2. The bioplastic of claim 1, wherein the oligosaccharide is obtained by hydrolysis of a polysaccharide obtained from a renewable source.

3. The bioplastic of claim 2, wherein the hydrolysis is performed in the presence of an acid.

4. The bioplastic of claim 1, wherein the oligosaccharide is obtained by hydrolysis of starch, agar, or a combination thereof.

5. The bioplastic of claim 1, wherein the oligosaccharide is obtained by hydrolysis of agar.

6. The bioplastic of claim 1, wherein the oligosaccharide is obtained by hydrolysis of a starch.

7. The bioplastic of claim 6, wherein the starch is selected from the group consisting of corn starch, arrowroot starch, barley starch, cassava starch, maize starch, millet starch, oat starch, potato starch, rice starch, tapioca starch, sago starch, sorghum starch, sweet potato starch, wheat starch, soy starch, and combinations thereof.

8. The bioplastic of claim 6, wherein the plasticizer is glycerol; the additive is a combination of powdered clamshell, powdered eggshell, and sawdust; and the bioplastic further comprises gelatin.

9. The bioplastic of claim 1, wherein the plasticizer is selected from the group consisting of polyethers, polyols, ureas, polyethylene glycols, glycerol, and sorbitol.

10. The bioplastic of claim 1, wherein the additive is powdered clamshell.

11. The bioplastic of claim 1, wherein the additive is powdered eggshell.

12. The bioplastic of claim 1, wherein the additive is powdered coconut shell.

13. The bioplastic of claim 1, wherein the additive is sawdust.

14. An article including a bioplastic of claim 1.

15. A process for making a bioplastic, the method comprising:
heating a mixture comprising a polysaccharide obtained from a renewable source, water, a plasticizer, and an additive, the additive being selected from the group consisting of powdered clamshell, powdered eggshell, powdered coconut shell, gelatin, saw dust, and combinations thereof;
applying the heated mixture to a mold of desired structure;
cooling the heated mixture in the mold to provide a molded structure; and,
removing the molded structure to form a bioplastic comprising an oligosaccharide, the plasticizer, and the additive.

16. The process of claim 15, wherein the polysaccharide is starch or agar.

17. The process of claim 15, wherein the mixture further comprises an acid.

18. The process of claim 17, wherein the acid is acetic acid.

19. A bioplastic obtained by the process of claim 15.

* * * * *